United States Patent
Bremmer et al.

(10) Patent No.: US 7,392,700 B2
(45) Date of Patent: Jul. 1, 2008

(54) METHOD AND SYSTEM FOR DETERMINING FUEL LEVEL

(75) Inventors: Lavern M Bremmer, Dexter, MI (US); Trevor Enge, West Bloomfield, MI (US); Robert W Schmidt, Novi, MI (US); Michael R Teets, Grosse Pointe Park, MI (US); Raymond Chastang, Inkster, MI (US)

(73) Assignee: Chrysler LLC, Auburn Hills, MI (US)

( * ) Notice: Subject to any disclaimer, the term of this patent is extended or adjusted under 35 U.S.C. 154(b) by 360 days.

(21) Appl. No.: 11/182,606

(22) Filed: Jul. 15, 2005

(65) Prior Publication Data

US 2007/0012103 A1    Jan. 18, 2007

(51) Int. Cl.
*G01F 23/24*    (2006.01)
(52) U.S. Cl. .................................... 73/304 R; 73/290 R
(58) Field of Classification Search ................. 73/304 R
See application file for complete search history.

(56) References Cited

U.S. PATENT DOCUMENTS

| | | | |
|---|---|---|---|
| 5,743,136 A | | 4/1998 | Gaston et al. |
| 6,634,229 B1 * | | 10/2003 | Kazkaz et al. ............ 73/304 R |
| 6,640,762 B2 | | 11/2003 | Ansaldi et al. |
| 6,820,483 B1 * | | 11/2004 | Beckerman ............... 73/304 C |
| 7,258,483 B2 * | | 8/2007 | Heldberg .................... 374/110 |
| 2005/0097952 A1 * | | 5/2005 | Steph et al. ............... 73/304 R |

* cited by examiner

*Primary Examiner*—Hezron E. Williams
*Assistant Examiner*—Mark Shabman
(74) *Attorney, Agent, or Firm*—Ralph E. Smith

(57) ABSTRACT

A method and system for determining the level of fuel contained in the tank of a motor vehicle includes a first resistive element disposed in the tank and having a first predetermined length. The first resistive element generates a variable resistance in response to electrical current and fuel passing therethrough. A second resistive element is also disposed in the tank and has a second predetermined length. The second resistive element generates a fixed resistance in response to the electrical current and fuel passing therethrough. A microprocessor coupled to the first and second resistive elements determines the level of fuel contained in the tank based on the variable resistance, the fixed resistance and the first and second predetermined lengths.

12 Claims, 1 Drawing Sheet

METHOD AND SYSTEM FOR DETERMINING FUEL LEVEL

FIELD OF THE INVENTION

The present invention relates to a method and system for determining the level of fuel contained in the tank of a motor vehicle.

BACKGROUND OF THE INVENTION

Fuel tanks of modern motor vehicles often have extremely irregular shape and disposition. This, in one sense, results in the fact that the indication of the level of fuel in the tank, typically provided by a sensor of one of the various known types, is not easily convertible into a reliable indication of the quantity of fuel available. Unreliability in the information relating to the quantity of fuel available has a particularly negative impact on the motor vehicle user upon starting out (beginning of a trip or journey) and, during journeys, on inclined roads.

Systems for indicating fuel level currently in use include mechanical, electromechanical or electronic "damping" means which makes it possible to attenuate the oscillations of the indication provided to the use upon variation in the level of the fuel in the tank due to swashing and in general, to oscillations in the level due to maneuvers or dynamic conditions involving rapid variations of the vehicle such as accelerations, braking, etc. Such systems thus allow rapid dynamic variations in the level of the fuel which, in fact, do not correspond to effective variations in the quantity of fuel available in the tank, to be "filtered."

Systems for indicating fuel level also typically include moving parts, which result in complexity and reliability problems. Thus, there exists a need for a simple system for determining fuel level in a fuel tank of a motor vehicle that is reliable.

SUMMARY OF THE INVENTION

It is an object of the present invention to provide a system for determining the level of fuel contained in the tank of a motor vehicle. The system includes a first resistive element disposed in the tank that has a first predetermined length. The first resistive element generates a variable resistance in response to both electrical current and the fuel passing therethrough. The system also includes a second resistive element disposed in the tank that has a second predetermined length and a reference resistance in response to both the electrical current and the fuel passing therethrough. The system still further includes a microprocessor coupled to the first and second resistive elements for determining the level of fuel contained in the tank based on the variable resistance, the fixed resistance and the first and second predetermined lengths.

It is another object of the present invention to provide a method for determining the level of fuel contained in the tank of a motor vehicle. The method includes determining a first resistance of a first resistive element disposed in the tank and having a first predetermined length, wherein the first resistance varies in response to both electrical current and the fuel passing therethrough. The method also includes the step of determining a fixed resistance of a second resistive element disposed in the tank and having a second predetermined length. The method finally includes the step of determining the level of fuel contained in the tank based on the variable resistance, the fixed resistance and the first and second predetermined lengths.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
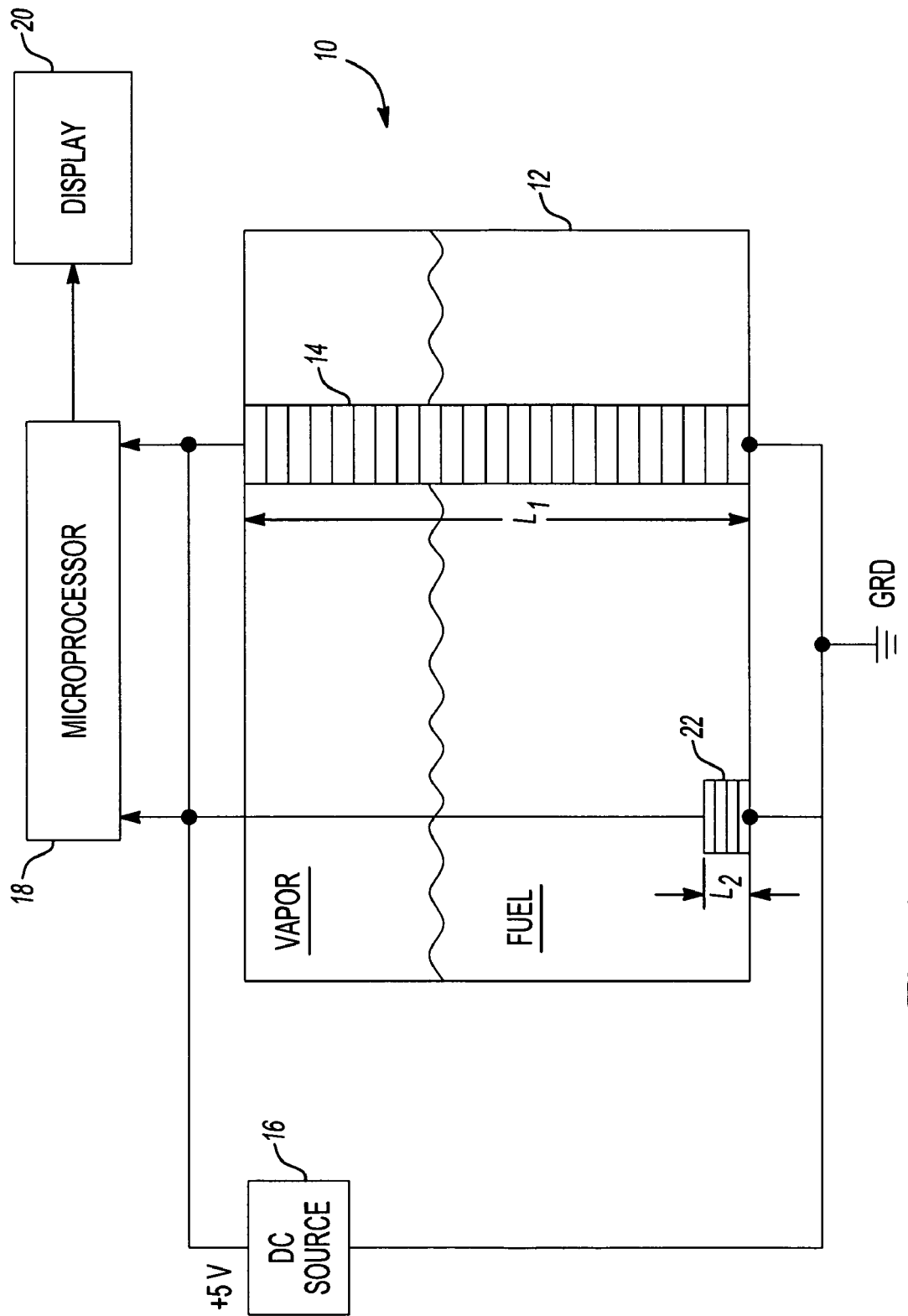
FIG. 1 is a representation, in block diagram form, of a preferred embodiment of a system according to the present invention.

The following description of the preferred embodiment(s) is merely exemplary in nature and is in no way intended to limit the invention, its application, or uses.

In FIG. 1 a system 10 according to the invention for determining the level or quantity of fuel contained in a tank 12 of a motor vehicle (not shown) is shown. The fuel tank 12 includes a first resistive element 14 disposed in the tank 12 and having a fixed length, L1. The length L1 of first resistive element 14 is essentially equal to the height of the fuel tank 12. The first resistive element 14 may be composed of an open cell material, such as a sponge, or a semi-porous rod. When current is passed through the first resistive element 14 via power supply 16, the resistance thereof will be constant or fixed when dry.

However, when the first resistive element 14 is submerged in an electrolyte solution, such as gasoline, the measured resistance of that portion of the first resistive element 14 submerged in the fuel decreases since the fuel acts somewhat like a short circuit. The remaining portion of the first resistive element 14 above and out of the fuel retains its original dry resistance for that portion. Consequently, as the fuel level decreases, the total resistance of the first resistive element 14 increases to its original dry resistance value.

The variable resistance output of the first resistive element 14 is input into a microprocessor, or controller, 18. The microprocessor 18 then determines the level of fuel in the tank 12, which can then be displayed on display 20 that is in electrical communication with microprocessor 18.

For example, if first resistive element 14 is 400 mm in length and has a dry resistance of 500 ohms for every 100 mm segment, when the tank 12 is ¾ full the first resistive element 14 will be ¾ submerged and have a measured resistance less than the known dry resistance of 2000 ohms total. If it assumed that the first resistive element 14 has 500 ohms resistance for each 100 mm segment and a wet resistance of 10 ohms for each 100 mm of submerged segment, the overall resistance of the first resistive element 14 will be 3×10 ohms (i.e., three 100 mm segments are submerged) plus 500 ohms (i.e., dry resistance for unsubmerged length) for a total of 530 ohms.

The complex nature of fuel mixtures results in electrolytical variance between mixtures. The resistance of the first resistive element 14 may be inconsistent between different fuel mixtures when at the same fuel level. Thus, a reference is preferred. The reference in the present invention is a second resistive element 22 that has a second predetermined length L2. The length L2 of the second resistive element 22 is short enough so that it is always submerged in the fuel and therefore has a fixed resistance value that is input to the microprocessor 18. Thus, the second resistive element 22 provides resistance-per-unit-length data to the microprocessor 18 while soaked in the electrolyte solution thereby normalizing the output resistance of the first resistive element 14.

The microprocessor 18 determines the level of fuel in the tank 12 based on the variable resistance of the first resistive element 14 and the fixed resistance of the second resistive element 22 according to the following equation:

$$\% \text{ of Fuel} = \{[(R_D - R_V)L2]/[(R_DL2 - R_2L1)]\} * 100\%,$$

where $R_D$ is the predetermined known dry resistance of first resistive element 14, $R_V$ is the variable measured resistance of first resistive element 14, L2 is the length of the second, or reference, resistive element 22, $R_2$ is the fixed resistance of second fully submerged resistive element 22, and L1 is the length of the first resistive element 14. The % of Fuel is stored in a look-up table for use in displaying a level of fuel via the display 20.

Thus, in summary, the present invention determines the level of fuel contained in a fuel tank 12 by determining a variable resistance of a first resistive element 14 disposed in the tank and having a first predetermined length, L1, wherein the first resistive element generates a variable resistance in response to both electrical current and the fuel passing therethrough. The method also includes determining a fixed resistance of a second resistive element 22 disposed in the tank 12 and having a second predetermined length, L2, wherein the second resistance element generates a fixed resistance in response to both the electrical current and the fuel passing therethrough. Finally, the microprocessor 18 determines the level of fuel contained in the tank 12 based on the variable resistance, the fixed resistance and the first and second predetermined lengths.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for determining the level of fuel contained in the tank of a motor vehicle comprising:
   a first resistive element disposed in the tank and having a first predetermined length L1, the first resistive element generating a variable resistance $R_V$ in response to electrical current and fuel passing therethrough;
   a second resistive element disposed in the tank and having a second predetermined length L2 and a fixed resistance $R_2$ in response to the electrical current and fuel passing therethrough; and
   a microprocessor coupled to the first and second resistive elements for determining the level of fuel contained in the tank based on the variable resistance, the fixed resistance and the first and second predetermined lengths in accordance with the following equation:

$$\text{fuel \% level} = \{[(R_D - R_V)L2]/[(R_DL2 - R_2L1)]\} * 100\%$$

where $R_D$ is a predetermined known dry resistance of the first resistive element.

2. The system as recited in claim 1 further comprising a display coupled to the microprocessor for displaying the determined level of fuel.

3. The system as recited in claim 1 wherein the first and second resistive element comprise open cell materials.

4. The system as recited in claim 3 wherein the open cell material is a sponge.

5. The system as recited in claim 1 wherein the second predetermined length is smaller than the first predetermined length.

6. The system as recited in claim 5 wherein the tank includes a predetermined minimum level of fuel at all times and wherein the second predetermined length is less than the predetermined minimum level of fuel.

7. A method for determining the level of fuel contained in the tank of a motor vehicle comprising:
   determining a variable resistance of a first resistive element disposed in the tank and having a first predetermined length L1, the first resistive element generating a variable resistance $R_V$ in response to electrical current and fuel passing therethrough;
   determining a fixed resistance of a second resistive element disposed in the tank and having a second predetermined length L2, the second resistance element generating a fixed resistance $R_2$ in response to the electrical current and fuel passing therethrough; and
   determining the level of fuel contained in the tank based on the variable resistance, the fixed resistance and the first and second predetermined lengths in accordance with the following equation:

$$\text{fuel \% level} = \{[(R_D - R_V)L2]/[(R_DL2 - R_2L1)]\} * 100\%$$

where $R_D$ is a predetermined known dry resistance of the first resistive element.

8. The method as recited in claim 7 further comprising displaying the level of fuel contained in the tank.

9. The method as recited in claim 7 wherein the first and second resistive elements comprise open cell materials.

10. The method as recited in claim 9 Wherein the open cell material is a sponge.

11. The method as recited in claim 7 wherein the second predetermined length is smaller than the first predetermined length.

12. The method as recited in claim 11 wherein the tank includes a predetermined minimum level of fuel at all times and wherein the second predetermined length is less than the predetermined minimum level of fuel.

* * * * *